United States Patent [19]
Sasaki

[11] 4,452,408
[45] Jun. 5, 1984

[54] TAPE CASSETTE

[75] Inventor: Shin Sasaki, Tagajo, Japan

[73] Assignee: Sony Corporation, Tokyo, Japan

[21] Appl. No.: 445,494

[22] Filed: Nov. 30, 1982

[30] Foreign Application Priority Data

Dec. 4, 1981 [JP] Japan .......................... 56-181306[U]
Dec. 4, 1981 [JP] Japan .......................... 56-181305[U]

[51] Int. Cl.³ .................... G03B 1/04; G11B 15/32; G11B 23/04
[52] U.S. Cl. .................... 242/199; 242/197; 360/132
[58] Field of Search .............. 242/192, 197–200; 360/96.1, 132, 93

[56] References Cited

U.S. PATENT DOCUMENTS

| 3,718,290 | 2/1973 | Wright | 242/199 |
| 3,826,489 | 7/1974 | Watkins, Jr. | 360/132 |
| 3,912,194 | 10/1975 | Chan | 242/199 |
| 4,076,186 | 2/1978 | Oishi et al. | 242/199 |
| 4,135,316 | 1/1979 | Saito | 35/35 A |
| 4,405,096 | 9/1983 | Possl | 242/199 |

Primary Examiner—Leonard D. Christian
Attorney, Agent, or Firm—Lewis H. Eslinger; Alvin Sinderbrand

[57] ABSTRACT

In a tape cassette having a cassette casing constituted by upper and lower, substantially rectangular halves which are secured together in mating relation for enclosing a pair of reel hubs rotatably mounted in side-by-side relation and a magnetic tape wound on the hubs and being guided therebetween in a path extending along one side of the casing; each of the upper and lower casing halves includes an opaque frame having a substantially large window opening therein and a window member of transparent resin closing the window opening of the respective opaque frame and being secured to the latter adjacent the peripheries of the window opening and window member, respectively, and projections formed integrally with the window member of at least one of the casing halves and each extending therefrom in the direction toward the interior of the casing for resisting inward removal of the respective window member from the window opening of the respective frame, and thereby maintaining the strength and rigidity of the cassette casing while permitting the use of window members of increased size for improved viewing of the tape and reel hubs within the casing.

13 Claims, 9 Drawing Figures

TAPE CASSETTE

BACKGROUND OF THE INVENTION

1. Field of the Invention

The present invention relates generally to tape cassettes, and is particularly directed to improvements in Phillips-type compact cassettes, such as are used in tape recorders and dictating machines.

2. Description of the Prior Art

Frequently, in compact cassettes, in order to increase the strength and useful life of the cassette casing, the usual upper and lower halves of the cassette casing are formed, for the most part, of a desirably strong non-transparent synthetic resin, such as, ABS resin, or a non-transparent metal, such as, aluminum, and window openings of relatively small size and which are closed by similarly small window members of transparent or semitransparent synthetic resin are provided only at the central portions of the upper and lower casing halves, respectively. Although such compact cassettes are sufficiently strong, the user cannot view the interior of most of the cassette casing, and thus cannot examine the condition of all of the tape wound on the reel hubs, and also cannot determine whether the tape extending between the hubs is properly engaged with the guides therefor. In order to overcome the foregoing disadvantage, a tape cassette has been made available in which the sizes of the window openings and the respective transparent window members included in the upper and lower casing halves have been substantially enlarged to permit the user to more fully view the interior of the casing.

However, as the size of the window member increases, the lengths of the welds by which the sides of the window member are secured, as by ultrasonic welding or the like, to the opaque frame or remaining portion of the respective casing half are increased accordingly. Weld defects tend to occur with increasing frequency upon such increases in the weld lengths. When such weld defects occur, the window members may be accidentally removed from the respective window openings as a result of impacts, vibrations or pressures applied to the cassette casing. In order to prevent such inadvertent removal of the enlarged window members from the respective window openings of the cassette casing, it has been proposed to employ a suitable adhesive, rather than ultrasonic welding, for securing each window member to the respective frame, or to provide dowels extending from the peripheral portion of the window member to be passed through holes in the respective frame and then upset or headed by pressure for preventing removal of the window member from the frame. However, such use of adhesive or upsetting of dowels for reliably securing the window members to the respective frames are time consuming, and thus reduce productivity and substantially increase the cost of manufacture of the cassette casings.

Furthermore, when the window members of the cassette casing are enlarged, as aforesaid, it becomes difficult to mount other components of the tape cassette, such as, tape guide rollers and friction bosses, at proper positions within the cassette casing. Although various procedures have been proposed, they usually involve cumbersome assembling steps and also the use of casing halves which are asymmetrical relative to each other, thereby decreasing the commercial attractiveness of the cassette casing.

OBJECTS AND SUMMARY OF THE INVENTION

Accordingly, it is an object of the present invention to provide a tape cassette which avoids the foregoing disadvantages of the prior art.

More particularly, it is an object of this invention to provide a tape cassette having a rigid and strong cassette casing which has transparent windows of relatively large size through which the interior of the cassette casing is substantially open to view by the user.

Another object is to provide a tape cassette, as aforesaid, which is of relatively simple construction and easy to assemble.

A further object of the invention is to provide a tape cassette, as aforesaid, in which the casing is formed of upper and lower casing halves symmetrically disposed relative to each other about a median of the rectangular casing.

In accordance with an aspect of this invention, in a tape cassette comprising a cassette casing constituted by upper and lower, substantially rectangular halves which are secured together in mating relation, a pair of reel hubs rotatably mounted in side-by-side relation within the casing, a magnetic tape wound on the hubs, friction control sheets in the casing sandwiching the hubs and tape between the upper and lower casing halves, and tape guides in the casing for directing the tape between the hubs in a path extending along one side of the casing; each of the upper and lower casing halves includes an opaque frame having a window opening therein extending over a large or substantial portion of the extent of the respective frame and a window member of a transparent resin closing the window opening of the respective opaque frame and being secured to the latter adjacent the peripheries of the window opening and window member, respectively, and a plurality of projections formed integrally with the window member of at least one of the casing halves and each extending therefrom in the direction toward the interior of the casing for resisting inward removal of the respective window member from the window opening of the respective frame.

In a preferred embodiment of this invention, at least some of the projections mentioned above extend from the window members of the upper and lower casing halves, respectively, and are located to abut end-to-end with each other when the casing halves are secured together in their mating relation. Desirably, each of the window members has a pair of the projections which abut end-to-end with a corresponding pair of the projections on the other of the window members, and such pairs of projections extend from the respective window members adjacent the peripheries of the latter and are located near to a median of the cassette casing.

The above, and other objects, features and advantages of the invention, will become readily apparent from the following detailed description of an illustrative embodiment of the invention which is to be read in connection with the accompanying drawings in which the same reference numerals are employed to identify corresponding parts in the several views.

DETAILED DESCRIPTION OF A PREFERRED EMBODIMENT

Figure 1:
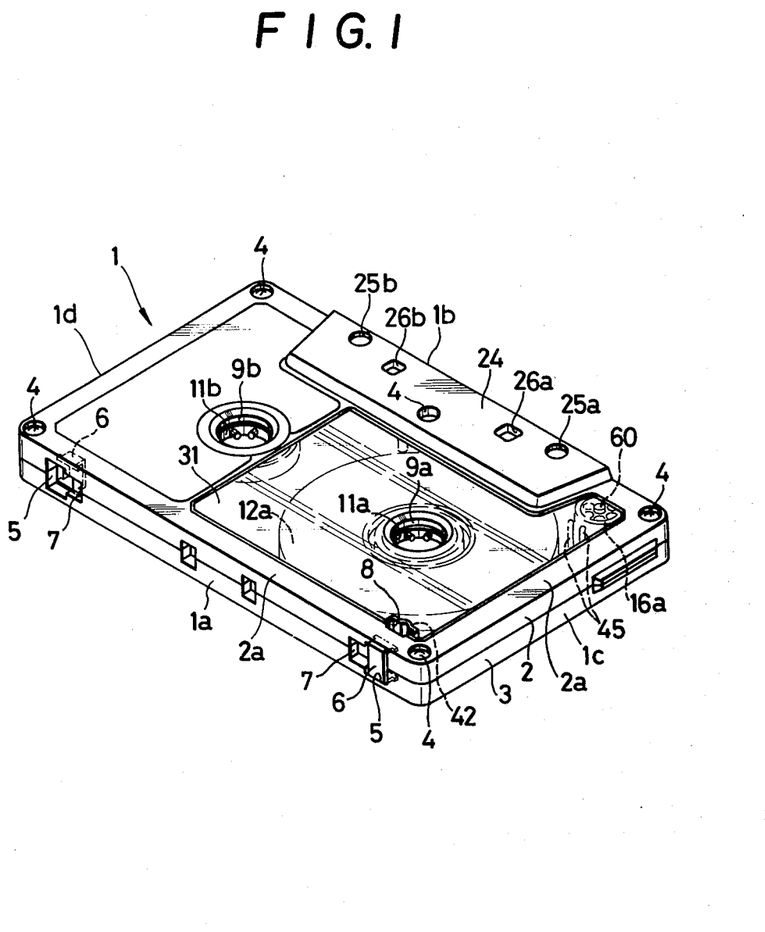
FIG. 1 is a perspective view showing a Phillipstype compact tape cassette in accordance with an embodiment of this invention.
Figure 2:
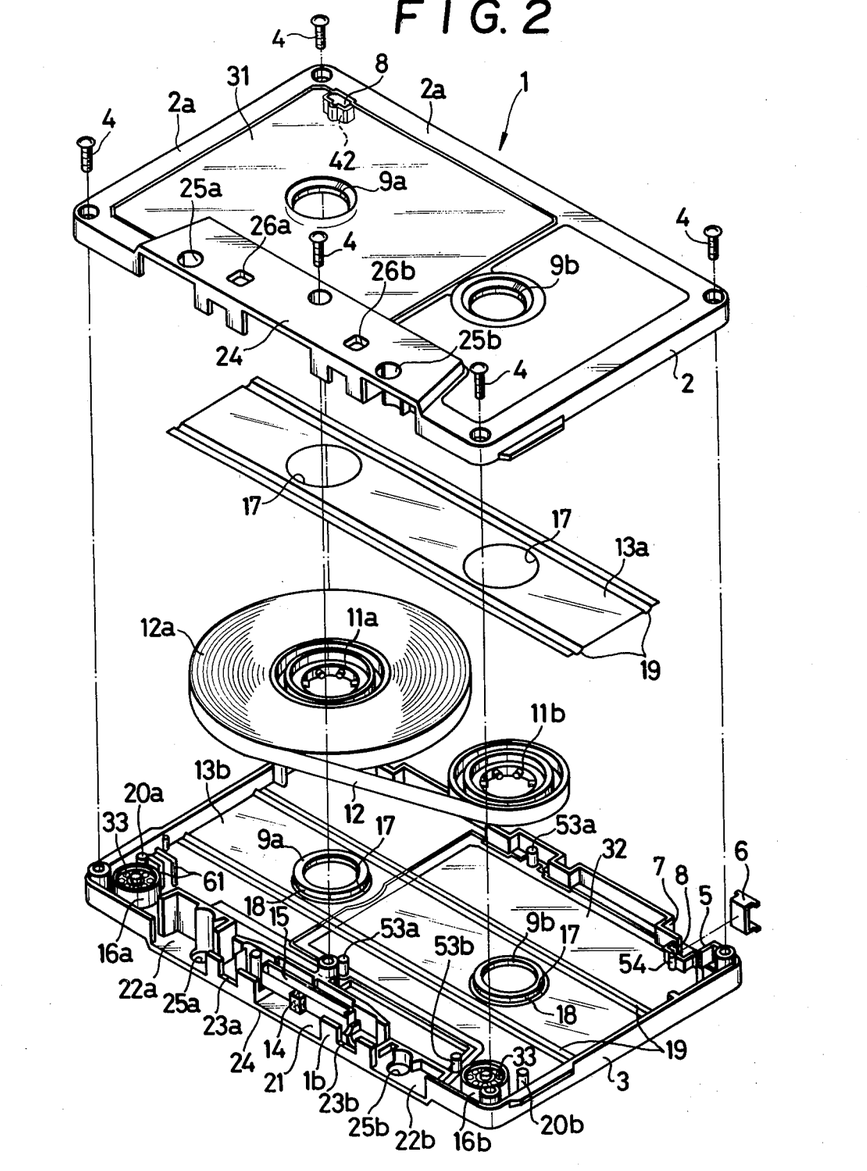
FIG. 2 is an exploded perspective view showing the several parts of the compact tape cassette of FIG. 1.
Figure 3:
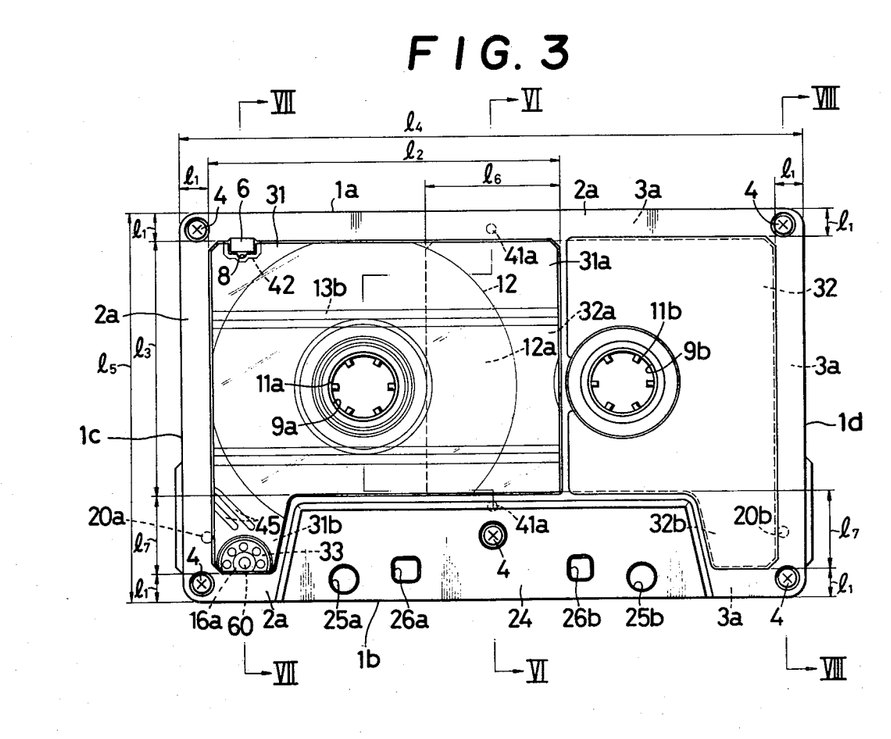
FIG. 3 is an enlarged top plan view of the compact tape cassette of FIG. 1.

Referring to the drawings in detail, and initially to FIGS. 1 and 2 thereof, it will be seen that a Phillips-type compact tape cassette in accordance with an embodiment of this invention generally comprises a cassette casing 1 formed as upper and lower halves 2 and 3 which are secured together in mating relation by means of five screws 4. The upper and lower casing halves 2 and 3 are substantially rectangular and include upper and lower frames 2a and 3a, respectively, formed of a suitably rigid non-transparent material, such as, opaque ABS resin or aluminum or other metal. As is shown particularly on FIG. 1, the peripheral wall of casing 1 is formed with a pair of accidental erasing prevention holes 5 disposed adjacent the opposite ends of the rear side 1a of the casing. Accidental erasing preventers 6 which are substantially U-shaped and formed of a synthetic resin are removably inserted in holes 5, respectively. When one of the accidental erasing preventers 6 is mounted in the respective hole 5 in the manner shown at the right-hand side of FIG. 1 so that the preventer 6 effectively closes or blocks the respective hole 5, corresponding tracks on a magnetic tape in casing 1 can be erased or recorded. However, when the accidental erasing preventer 6 is turned around and inserted in the respective hole 5 in the manner shown at the left-hand side of FIG. 1, the U-shaped preventer 6 substantially conforms to the interior shape of hole 5 so that the latter is open and cooperates with a conventional sensing element (not shown) of a tape recording and/or reproducing apparatus to prevent accidental erasing of signals recorded in the respective tracks on the tape, or the re-recording in such tracks. Each accidental erasing preventer 6 is elastically and frictionally secured in the respective hole 5 in either one of the previously described positions. When the user wishes to remove a preventer 6 from the respective hole 5 with the preventer 6 being in the position illustrated at the right-hand side of FIG. 1, the user inserts the tip of a pencil or the like into a horizontal extension 7 of the respective hole 5 so as to engage the pencil tip under the cross-piece of the U-shaped preventer 6 and thereby permit the latter to be pried out of the respective hole 5. On the other hand, if preventer 6 is in the position shown at the left-hand portion of FIG. 1, the user inserts the pencil tip or the like in a vertically extended hole 8 which communicates with the respective horizontally directed hole 7, and which, in the case of the hole 5 at the left-hand portion of casing 1, is formed in lower casing half 3 and, in the case of hole 5 at the right-hand side of FIG. 1, is formed in upper casing half 2. With the pencil tip thus inserted into a vertical hole 8, the tip is engagable through the respective hole 7 with the cross-piece of accidental erasing preventer 6 for prying the latter out of the respective hole 5.

Laterally spaced apart circular apertures 9a and 9b are formed in the upper and lower halves 2 and 3 of casing 1 to permit respective reel drive shafts (not shown) of a tape cassette recording and/or reproducing apparatus to be inserted in casing 1 when the latter is operatively positioned on the apparatus. As shown particularly on Figs. 2 and 5, a pair of reel hubs 11a and 11b are contained within casing 1, and a magnetic tape 12 has its opposite ends attached to hubs 11a and 11b, respectively, and is wound on such hubs. Upper and lower friction control or reducing sheets 13a and 13b of a transparent synthetic resin sheet material sandwich the hubs 11a and 11b and tape 12 between the upper and lower casing halves 2 and 3, respectively. Each of the friction control sheets 13a and 13b has a pair of spaced apart circular holes 17 therein to receive a pair of circular ribs 18 formed around the holes 9a and 9b of the respective casing half 2 or 3. At least the surfaces of sheets 13a and 13b which are engagable with tape 12 are treated to prevent the build up of an electric charge thereon, and are further treated to have a low coefficient of friction in respect to the tape material. Further, each of the sheets 13a and 13b is formed with a pair of longitudinally extending, spaced apart ribs 19 of semi-circular cross-section which extend parallel to each other at the front and rear, respectively of the circular holes 17.

Figure 6:
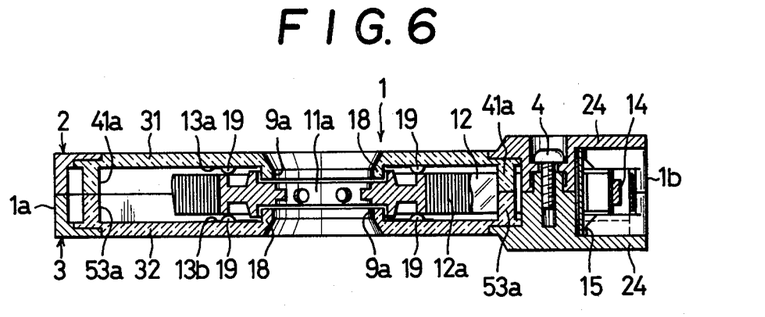
FIG. 6 is an enlarged sectional view taken along the line VI—VI on FIG. 3.
Figure 7:
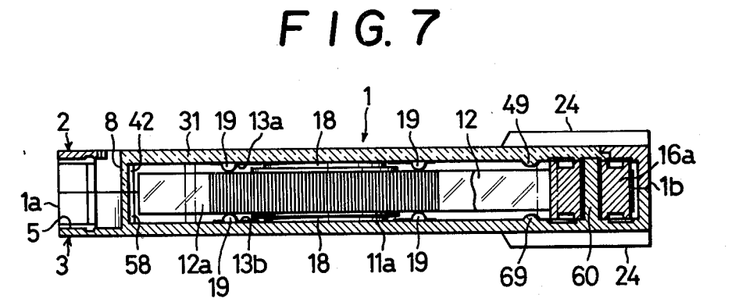
FIG. 7 is an enlarged sectional view taken along the line VII—VII on FIG. 3.
Figure 8:
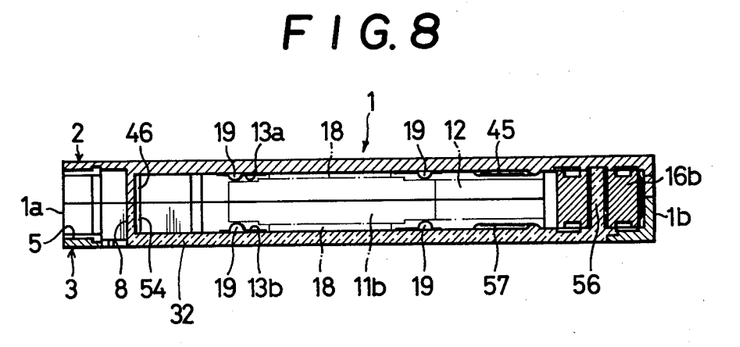
FIG. 8 is an enlarged sectional view taken along the line VIII—VIII on FIG. 3.
Figure 9:
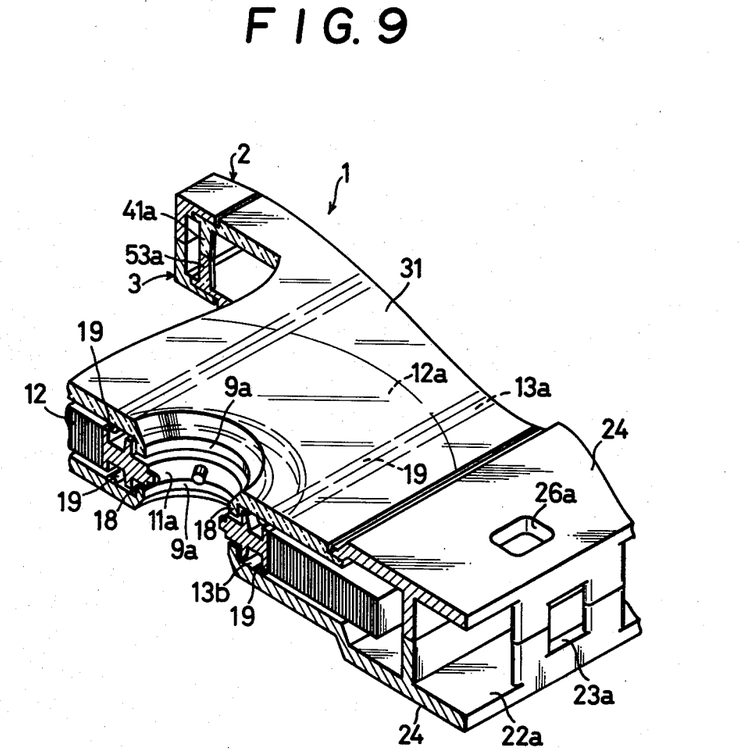
FIG. 9 is a fragmentary, enlarged perspective view which is partly broken away and in section for illustrating important features of the compact tape cassette shown on FIG. 1.

When upper and lower casing halves 2 and 3 are assembled together, reel hubs 11a and 11b extend rotatably about circular ribs 18 which are directed inwardly toward each other around circular holes 9a and 9b, respectively, as particularly shown on FIG. 6 in respect to hub 11a. Further, as shown on FIGS. 6 and 9, hubs 11a and 11b, and the coils 12a of magnetic tape 12 which are wound around such hubs, are elastically engaged between the projections 19 directed inwardly from the upper and lower friction control sheets 13a and 13b. Such sheets 13a and 13b and the ribs or projections 19 extending therefrom ensure that tape 12 will be smoothly and uniformly wound around hubs 11a and 11b.

As further shown on FIG. 2, the Phillips-type compact tape cassette according to an embodiment of this invention further comprises the usual tape pad 14 mounted on a resilient or spring strip, a magnetic shield plate 15 and a pair of tape guide rollers 16a and 16b by which a run of the tape 12 between reel hubs 11a and 11b is guided to extend along the front side 1b of the cassette casing 1, with the tape being further guided about a friction boss 20a between hub 11a and roller 16a and by a friction boss 20b between hub 11b and guide roller 16b.

Figure 5:
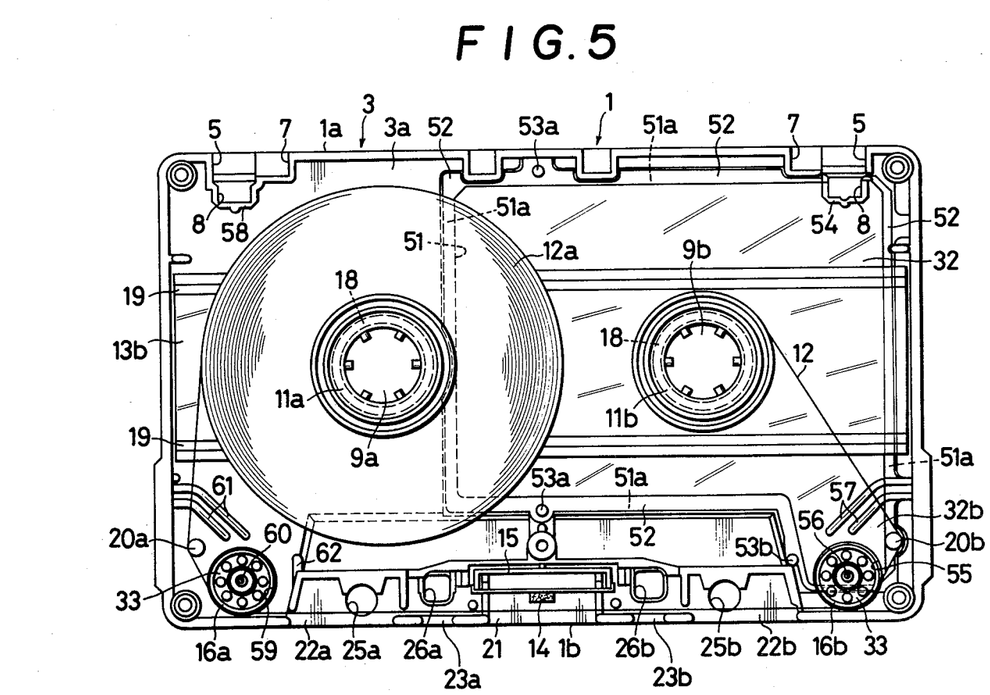
FIG. 5 is a top plan view similar to that of Fig. 3, but showing the compact tape cassette of FIG. 1 with the upper half of its casing removed.

As is particularly shown on FIGS. 2 and 5, a magnetic head insertion window 21 is formed in the peripheral wall of cassette casing 1 at the center of the front side 1b thereof, and a pair of right and left pinch roller insertion windows 22a and 22b are also formed in the peripheral wall adjacent the opposite end portions of side 1b. Further, relatively small windows 23a and 23b are formed in the peripheral wall at front side 1b between central magnetic head insertion window 21 and pinch roller insertion windows 22a and 22b, respectively. Upper and lower casing halves 2 and 3 are formed with substantially trapezoidal raised areas 24 extending along side 1b of the cassette casing. Capstan insertion holes 25a and 25b extend through such raised surface portions 24 of casing halves 2 and 3 and are positioned immediately in back of pinch roller insertion windows 22a and 22b. Positioning pin insertion holes 26a and 26b also extend through raised surface portions 24 of casing halves 2 and 3 and are positioned in back of the small windows 23a and 23b, respectively.

As shown particularly on FIGS. 2-5, the upper and lower casing halves 2 and 3 of the tape cassette according to this invention include, in addition to the upper and lower frames 2a and 3a, respectively, relatively large window members 31 and 32, respectively, which are formed of a transparent or colored semi-transparent synthetic resin, such as, an acrylic resin, and which are mounted against respective seats formed at the inner surfaces of frames 2a and 3a, respectively, along the peripheries of respective window openings, as hereinafter described in detail. As viewed on FIG. 3, upper window member 31 extends over substantially the entire left-hand portion of upper casing half 2, while lower window member 32 extends over substantially the entire right-hand portion of lower casing half 3 and such window members 31 and 32 are of the same size and shape so as to be symmetrically disposed relative to each other about the median of rectangular halves 2 and 3 which extends between the rear and front sides 1a and 1b of the casing. Each of the upper and lower window members 31 and 32 is seen to have a width $l_2$ which is greater than one-half of the overall width $l_4$ of cassette casing 1, and the periphery of each of window members 31 and 32 is otherwise defined to follow the periphery of the respective raised trapezoidal area 24, and thereafter the periphery of casing 1 at the previously mentioned sides 1a and 1b and at a side 1c or 1d therebetween, with a margin $l_1$ being provided between such peripheral portions of cassette casing 1 and the periphery of each of the window members 31 and 32. Such margin $l_1$ is made sufficiently small so that the length $l_3$ of the window member 31 or 32 measured from the periphery of the respective raised area 24 to the edge adjacent side 1a of casing 1 is greater than one-half the length $l_5$ of the casing, that is, the dimension of the casing measured between the sides 1a and 1b thereof. As a result of window members 31 and 32 each having a width $l_2$ greater than one-half the width $l_4$ of casing 1, such window members 31 and 32 have portions 31a and 32a which overlap for a distance $l_6$ at the central portion of cassette casing 1. Furthermore, portions 31b and 32b (FIGS. 3 and 5) project for distances $l_7$ from the main bodies of window members 31 and 32 in the direction toward front side 1b of casing 1 at the flanks of the raised areas 24 so as to constitute parts of upper and lower casing halves 2 and 3 which extend over tape guide rollers 16a and 16b, respectively.

Since the upper and lower window members 31 and 32 are large and overlapping at their portions 31a and 32a, and the friction control sheets 13a and 13b are transparent, the interior of cassette casing 1 is substantially exposed to view. Therefore, the user can readily check the amount of the magnetic tape remaining to be recorded, and also the manner in which reel hubs 11a and 11b rotate during recording and/or reproducing. Furthermore, since portions 31b and 32b of window members 31 and 32 extend over tape guide rollers 16a and 16b, the user can also readily check through such portions 31b and 32b of the transparent window members whether the tape guide rollers 16a and 16b are rotating freely and smoothly, and whether the tape 12 is properly engaged therewith. The movements of any other components of the tape cassette can also be readily observed. Moreover, in order to effectively emphasize the movements of guide rollers 16a and 16b when observed through window member portions 31b and 32b, such guide rollers 16a and 16b may be formed with three-dimensional or colored patterns, as at 33 on FIGS. 2 and 3, to form rotation indicators. Since each of window members 31 and 32 is, in effect, surrounded by the respective opaque frame 2a or 3a and seats against an inner peripheral surface of the respective frame, the joint or attachment of each window member 31 or 32 to the respective frame 2a or 3a is not exposed to view and, therefore, the tape cassette is of attractive, high-quality appearance.

Figure 4:
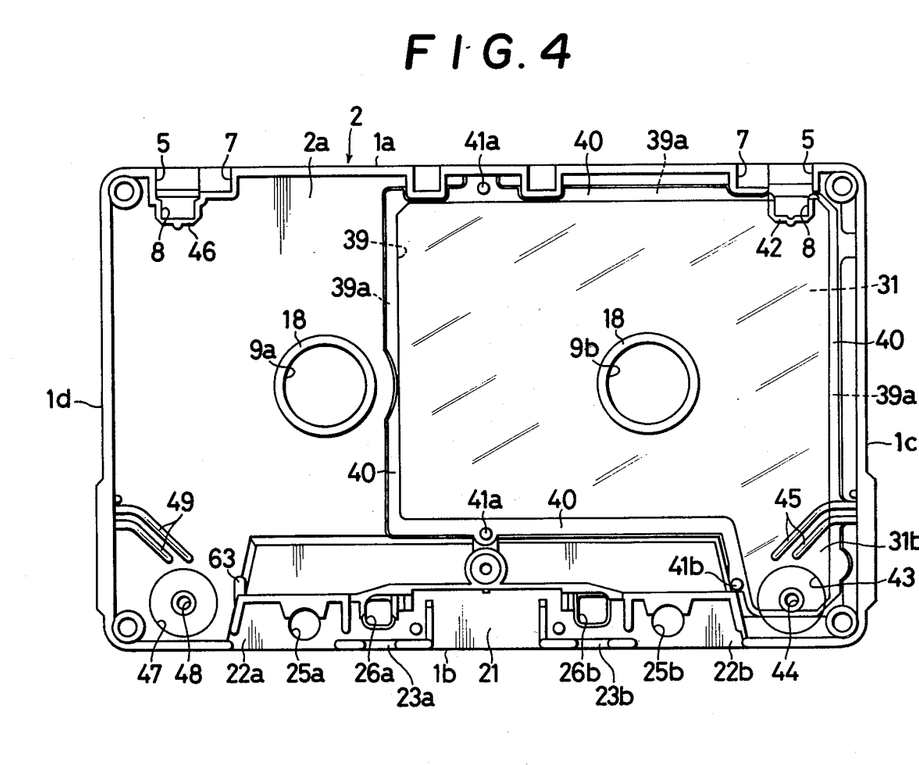
FIG. 4 is a plan view showing the inside of an upper half of the casing of the compact tape cassette of FIG. 1.

As shown particularly on FIG. 4 with reference to the mounting of upper window member 31 in the respective frame 2a of upper casing half 2, such frame 2a has a window opening 39 with a configuration similar to, but slightly smaller than the peripheral configuration of window member 31 so that a peripheral portion 40 of window member 31 extends against the inner surface of a peripheral portion 39a of frame 2a extending around opening 39. Such peripheral portion 40 of window member 31 is desirably welded, as by ultrasonic welding, to the peripheral portion 39a of frame 2a. However, by reason of the large area of window member 31, such ultrasonic welding would not reliably secure window member 31 to frame 2a, that is, by reason of the possibility of defects in the relatively long ultrasonic welds, impacts or pressure directed inwardly against window member 31 might cause the inward separation of window member 31 from the respective frame 2a.

In accordance with the present invention, such separation of window member 31 from frame 2a is simply prevented by providing window member 31, at its peripheral portion 40, with a plurality of projections 41a, 41b and 42 molded or formed integrally with window member 31 at suitably spaced apart locations and being directed inwardly from peripheral portion 40, that is, in the direction into the interior of casing 1. More particularly, and as shown on FIG. 4, the projections formed integrally with the peripheral portion 40 of window member 31 include two pins 41a located adjacent the median of casing 1 between sides 1c and 1d on portions of the periphery 40 which will be adjacent side 1a of the cassette casing and the raised area 24, respectively. The projections provided on window member 31 in accordance with this invention further include a pin 41b extending from the periphery 40 at the portion 31b of the window adapted to extend over tape guide roller 16a, and a substantially U-shaped projection 42 which is positioned to extend around the respective opening or hole 8. As shown particularly on FIG. 4, a circular recess 43 is, at least in part, formed in the undersurface of extending portion 31b of window member 31 and, at the center of such circular recess 43, there is also formed a relatively deeper pin-receiving recess 44. Magnetic tape height-regulating ribs 45 extend parallel to each other at the underside of the extending portion 31b of window member 31 and continue on the adjacent portion of frame 2a. As is further clearly shown on FIG. 4, the circular apertures 9a and 9b of upper casing half 2 are formed in the respective frame 2a and window member 31 which are correspondingly formed with the inwardly directed ribs 18 extending about circular apertures 9a and 9b. It will also be seen that, at the underside of frame 2a, the latter is formed with an integral U-shaped projection 46, a circular recess 47 in which there is a central, relatively deeper pin-receiving recess 48 and magnetic tape height regulating ribs 49 which are respectively similar to projection 42, circular recess 43, pin-receiving recessed bore 44 and ribs 45, but disposed symmetrically at the opposite side of the median of the casing 1 on which pins 41a are disposed.

Referring now to FIG. 5, it will be seen that the mounting of lower window member 32 in frame 3a of lower casing half 3 is similar to the above-described mounting of window member 31 in frame 2a. More specifically, frame 3a is shown to have a window opening 51 of slightly smaller size than the respective window member 32 so as to provide a peripheral portion 51a around window opening 51 which, at its inner surface, defines a seat for the peripheral portion 52 of window member 32. As before, the peripheral portion 52 of window member 32 is secured by ultrasonic welding or the like to the peripheral portion 51a of frame 3a. Further, in accordance with the present invention, the peripheral portion 52 of lower window member 32 has integrally formed projections 53a, 53b and 54 directed upwardly therefrom, that is, extending inwardly in respect to the interior of cassette casing 1. Such projections are shown to include pins 53a and 53b, and a U-shaped projection 54 which are positioned on window member 32 similarly to the pins 41a and 41b and the U-shaped projection 42 on window member 31. The upper surface of the portion 32b of window member 32 is formed with a circular recess 55, at the center of which there is an upstanding guide roller support pin 56 for rotatably mounting guide roller 16b. Further, a pair of parallel, magnetic tape height regulating ribs 57 are formed on window member portion 32b which also has friction boss 20b molded integrally therewith. The circular ribs 18 extending around the circular apertures 9a and 9b of casing half 3 are respectively formed on frame 3a and on window member 32. At the inner or upper surface of frame 3a of casing half 3 there are further formed a U-shaped projection 58 extending around the opening 8 which is adjacent the left-hand end of side 1a of casing 1, as viewed on FIG. 5, and a circular recess 59 at the center of which a pin 56 projects upwardly for rotatably mounting tape guide roller 16a. Finally, frame 3a is integrally formed with a pair of parallel magnetic tape height regulating ribs 61 and the friction boss 20a.

The pins 41a on window member 31 and the pins 53a on window member 32 are disposed to abut end-to-end when casing halves 2 and 3 are assembled in mating relation, as on FIG. 6. Similarly, the pins 41b and 53b are disposed on window members 31 and 32 so that, in the assembled relation of casing halves 2 and 3, such pins 41b and 53b will respectively abut, at their ends, against projections 62 and 63 (FIGS. 5 and 4), formed integrally with frames 3a and 2a, respectively. Finally, the U-shaped projections 42 and 54 on window members 31 and 32 are located to engage or abut end-to-end against U-shaped projections 58 and 46 on frames 3a and 2a, respectively, when casing halves 2 and 3 are in assembled relation.

The above described arrangement of the various parts of the tape cassette embodying this invention greatly facilitates the automatic assembling thereof. Since pins 56 and 60 and friction bosses 20a and 20b are formed as integral parts of frame 3a and window member 32 of lower casing half 3, reel hubs 11a and 11b with tape 12 wound thereon are initially engaged about circular ribs 18 of casing half 3, with the tape 12 between hubs 11a and 11b being guided about friction bosses 20a and 20b and about guide rollers 16a and 16b which are rotatably mounted on pins 60 and 56, respectively, and have their lower ends located in recesses 59 and 55. Thereafter, upper casing half 2 is assembled on top of lower casing half 3, as shown on FIGS. 1 and 6–8. When upper casing half 2 is thus assembled on lower casing half 3, the upper end surfaces of friction bosses 20a and 20b are in contact with the downwardly facing surfaces of frame 2a and window member 31, respectively. Further, the upper ends of guide roller support pins 56 and 60 are engaged in relatively deep recesses 48 and 44, respectively, and the upper end portions of tape guide roller 16a and 16b are received in circular recesses 43 and 47, respectively. As earlier noted, the upper end faces of the two pins 53a of window member 32 engage the lower end faces of the two pins 41a of window member 31, respectively, and the lower end faces of the U-shaped projections 42 and 46 on upper casing half 2 engage the upper end surfaces of the U-shaped projections 58 and 54, respectively, of the lower casing half 3, so as to define the wall surfaces of the holes 8 in casing 1. Finally, the pins 41b and 53b on window members 31 and 32 engage, at their ends, against projections 62 and 63 on frames 3a and 2a, respectively.

By reason of the above described engagement between the pairs of pins 41a and 53a, between friction boss 20a and window member 31, between U-shaped projections 42 and 54 and U-shaped projections 58 and 46, and between pins 41b and 53b and projections 62 and 63, respectively, window members 31 and 32 are securely held, at locations spaced apart along their respective peripheries 40 and 52, against movement away from the respective peripheral portions 39a and 51a extending along the window openings 39 and 51 in frames 2a and 3a, respectively. Therefore, even if the attachment of window members 31 and 32 to frames 2a and 3a, as by ultrasonic welding along the peripheral portions 39a and 40, and 51a and 52 may be of limited strength by reason of the substantial lengths of the welds caused by the large sizes of window members 31 and 32, such window members 31 and 32 cannot be separated from the respective frames 2a and 3a, and especially cannot be pushed into the interior of the casing 1 by vibrations, or impacts or pressures applied inwardly against casing 1 at window members 31 and 32.

Thus, in accordance with this invention, a cassette casing 1 of the requisite strength is achieved even though window members 31 and 32 are large and symmetrically disposed relative to each other about a median of the casing so as to permit viewing of the tape 12 on both reel hubs 11a and 11b, and both tape guide rollers 16a and 16b on pins 56 and 60. Further both sides of the cassette casing, that is, the so-called "A and B sides", are of similar appearance so as to provide a tape cassette of high quality and attractive appearance.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a tape cassette comprising a cassette casing constituted by upper and lower, substantially rectangular halves which are secured together in mating relation, a pair of reel hubs rotatably mounted in side-by-side relation within said casing, a magnetic tape wound on said hubs, friction control sheets in said casing sandwiching said hubs and tape between said upper and lower casing halves, and tape guides in said casing for directing the tape between said hubs in a path extending along one side of the casing; the improvement comprising each of said upper and lower casing halves including an opaque frame having a window opening therein extending over a substantial portion of the extent of the respective frame and a window member of a transparent resin closing said window opening of the respective opaque frame and being secured to the latter adjacent the peripheries of said window opening and window member, respectively, and a plurality of projections formed integrally with said window member of at least one of said casing halves and each extending therefrom in the direction toward the interior of said casing for resisting inward removal of the respective window member from the window opening of the respective frame.

2. A tape cassette according to claim 1; in which at least some of said projections extend from said window members of said upper and lower casing halves, respectively, and are located to abut end-to-end with each other when said casing halves are secured together in said mating relation.

3. A tape cassette according to claim 2; in which each of said window members has a pair of said projections which abut end-to-end with a corresponding pair of said projections on the other of said window members.

4. A tape cassette according to claim 3; in which said projections extend from the respective window members adjacent the peripheries of the latter.

5. A tape cassette according to claim 4; in which said projections of each said pair are located adjacent a median of said cassette casing.

6. A tape cassette according to claim 1; in which at least some of said projections are in the form of pins which mount said tape guides in said casing.

7. A tape cassette according to claim 6; in which said tape guides are in the form of tape guide rollers rotatable on said pins.

8. A tape cassette according to claim 7; in which said tape guide rollers are located adjacent opposite corners of said casing which are at remote ends of said one side of the casing, and said window members of said upper and lower casing halves have portions extending near said opposite corners, respectively, for exposing therethrough at least parts of the adjacent tape guide rollers.

9. A tape cassette according to claim 1; in which said friction control sheets sandwiching said hubs and tape are of a substantially transparent material so as to avoid interference with viewing of said hubs and tape through said window members.

10. A tape cassette according to claim 1; in which each said opaque frame is of a synthetic resin.

11. A tape cassette according to claim 1; in which each said opaque frame is of metal.

12. A tape cassette according to claim 1; in which each of said window members has long and short sides which are more than one-half the lengths of similarly extending long and short sides, respectively, of the corresponding opaque frame.

13. A tape cassette according to claim 12; in which said window members of the upper and lower casing halves are symmetrically disposed relative to each other about a median of said rectangular halves.

* * * * *